(12) United States Patent
Schumacher

(10) Patent No.: US 10,898,832 B2
(45) Date of Patent: Jan. 26, 2021

(54) FILTER DEVICE FOR A FILTER SYSTEM OF A MOTOR VEHICLE

(71) Applicant: Daimler AG, Stuttgart (DE)

(72) Inventor: Eric Schumacher, Bingen (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 16/087,501

(22) PCT Filed: Mar. 20, 2017

(86) PCT No.: PCT/EP2017/000353
§ 371 (c)(1),
(2) Date: Sep. 21, 2018

(87) PCT Pub. No.: WO2017/162330
PCT Pub. Date: Sep. 28, 2017

(65) Prior Publication Data
US 2019/0105586 A1    Apr. 11, 2019

(30) Foreign Application Priority Data

Mar. 24, 2016    (DE) .......................... 10 2016 003 699

(51) Int. Cl.
*B01D 27/08* (2006.01)
*B60H 3/06* (2006.01)

(52) U.S. Cl.
CPC ........... *B01D 27/08* (2013.01); *B60H 3/0658* (2013.01); *B01D 2201/4007* (2013.01);
(Continued)

(58) Field of Classification Search
CPC ............ B01D 27/08; B01D 2201/4023; B01D 2201/4015; B01D 2201/4007; B60H 3/0658; B60H 2003/0666
(Continued)

(56) References Cited

U.S. PATENT DOCUMENTS

| 4,764,275 A | 8/1988 | Robichaud |
| 7,934,617 B2 * | 5/2011 | Minowa ................. B01D 29/21 210/232 |
| 2016/0339364 A1 | 11/2016 | Thalmann et al. |

FOREIGN PATENT DOCUMENTS

| CN | 2731271 Y | 10/2005 |
| CN | 203423302 U | 2/2014 |

(Continued)

OTHER PUBLICATIONS

PCT/EP2017/000353, International Search Report, dated Jul. 7, 2017 (Two (2) pages).

(Continued)

*Primary Examiner* — Madeline Gonzalez
(74) *Attorney, Agent, or Firm* — Crowell & Moring LLP

(57) ABSTRACT

A filter device for a filter system of a motor vehicle includes a filter element which is securable to a filter module. A filter element securing structure is disposed on the filter element where the filter element securing stricture interacts with a respective securing structure disposed on the filter module to form a bayonet closure. The filter element securing structure is an arc-shaped guide groove in a base of the filter element, where the arc-shaped guide groove has an insertion opening at a first end and a latching contour at a second end. The respective securing structure disposed on the filter module is a head pin that is receivable in the arc-shaped groove, An edge region of the arc-shaped guide groove slopes from the insertion opening to the latching contour.

5 Claims, 3 Drawing Sheets

(52) U.S. Cl.
CPC ............... *B01D 2201/4015* (2013.01); *B01D 2201/4023* (2013.01); *B60H 2003/0666* (2013.01)

(58) Field of Classification Search
USPC ............... 210/232, 167.01, 167.02, DIG. 17
See application file for complete search history.

(56) References Cited

FOREIGN PATENT DOCUMENTS

| CN | 103987437 A | 8/2014 |
|---|---|---|
| DE | 82 28 745 U1 | 3/1984 |
| DE | 10 2007 011 256 B4 | 2/2009 |
| DE | 10 2008 016 073 B3 | 10/2009 |
| DE | 10 2013 011 622 A1 | 1/2015 |
| DE | 10 2014 009 327 A1 | 12/2015 |
| EP | 0 221 675 A2 | 5/1987 |
| JP | 62-97617 A | 5/1987 |
| JP | 7-251010 A | 10/1995 |
| JP | 10-47593 A | 2/1998 |
| JP | 2006-125314 A | 5/2006 |
| JP | 2007-46523 A | 2/2007 |
| JP | 2008-267169 A | 11/2008 |
| JP | 2009-119390 A | 6/2009 |
| JP | 2010-112360 A | 5/2010 |
| KR | 89-0003449 B1 | 9/1989 |
| WO | WO 2015/091665 A1 | 6/2015 |
| WO | WO 2015/197581 A1 | 12/2015 |

OTHER PUBLICATIONS

German Office Action issued in German counterpart application No. 10 2018 003 699.0 dated Feb. 7, 2017 (Six (6) pages).
Japanese Office Action issued in Japanese counterpart application No. 2018-549468 dated Aug. 13, 2019, with partial English translation (Ten (10) pages).
Korean-language Korean Office Action issued in Korean application No. 10-2018-7026332 dated Feb. 27, 2020 (Six (6) pages).
Chinese Office Action issued in Chinese application No. 201780019172.5 dated May 29, 2020, with partial English translation (Nine (9) pages).

* cited by examiner

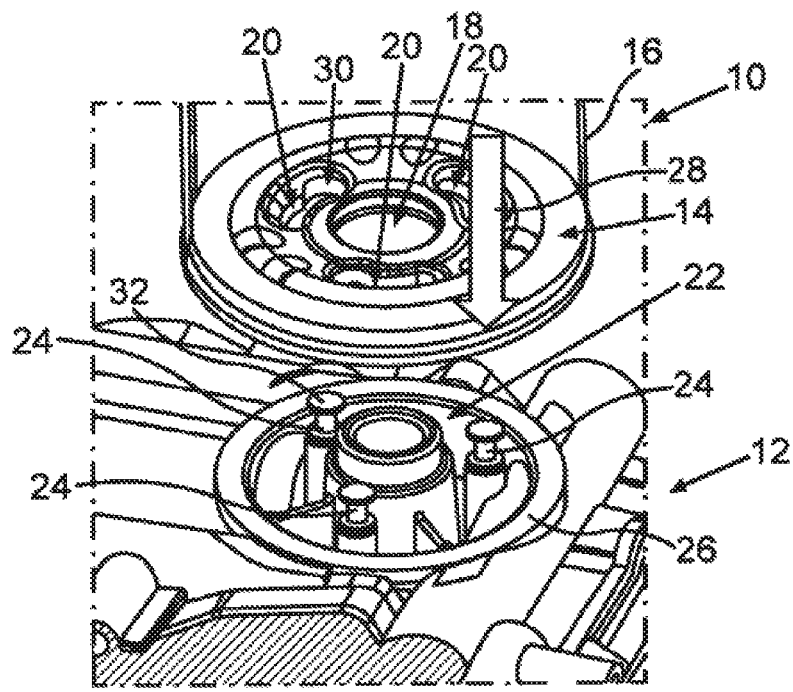
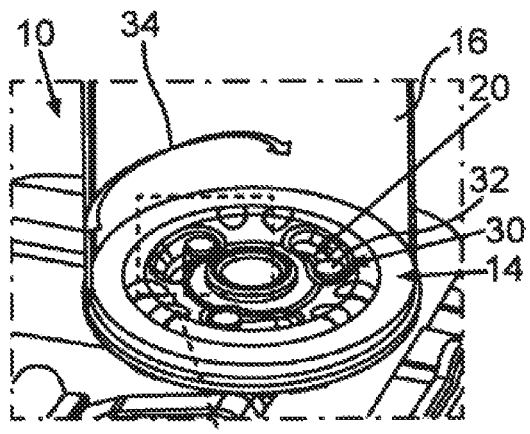
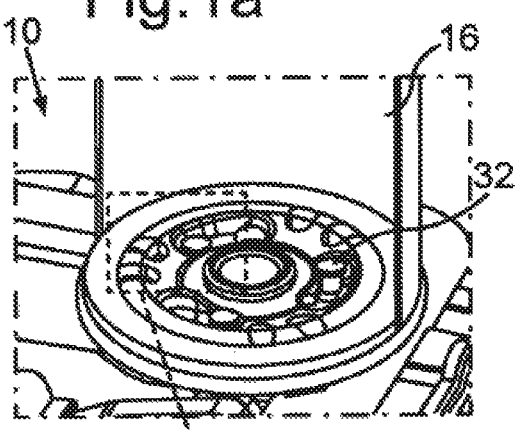
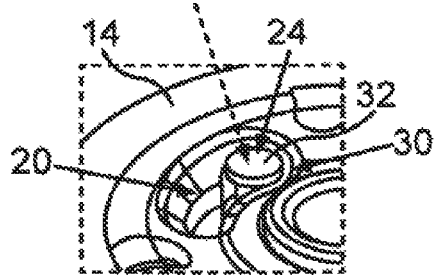
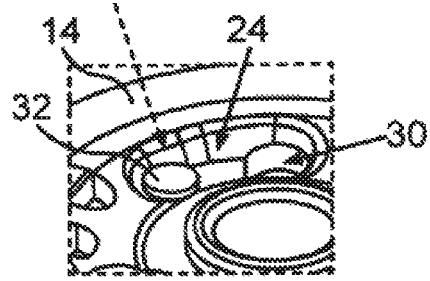
Fig.1a
Fig.1b  Fig.1c

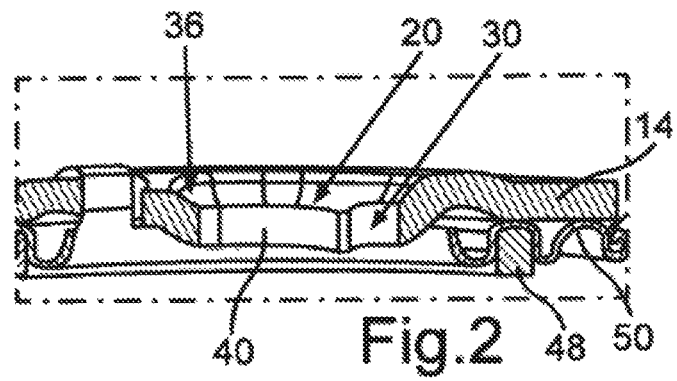
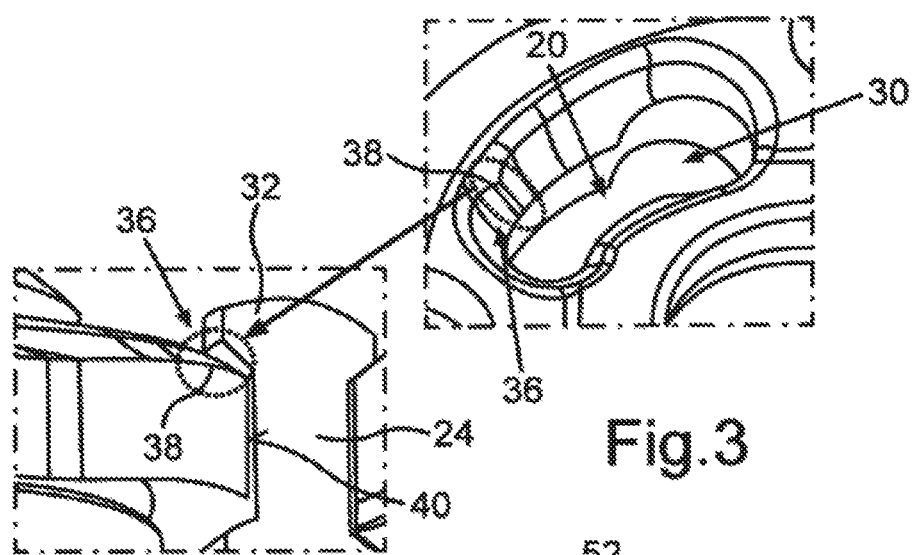
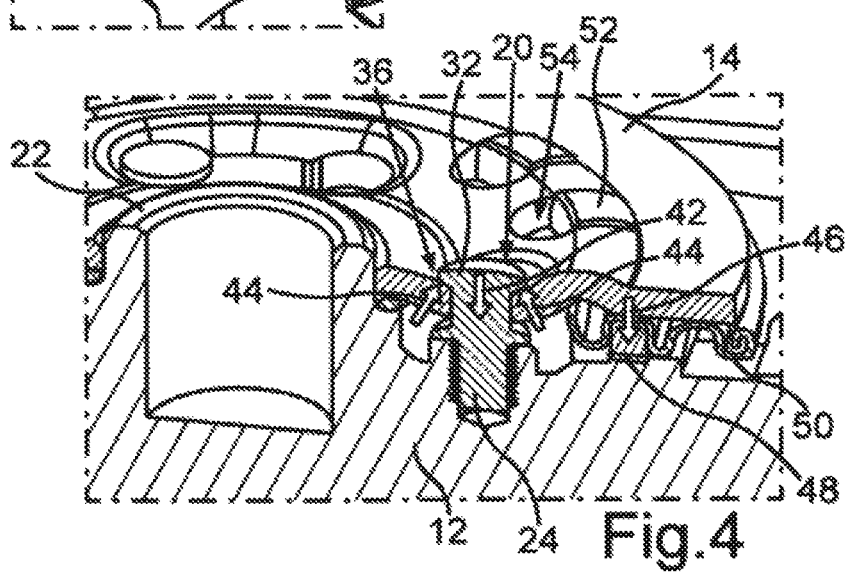

FILTER DEVICE FOR A FILTER SYSTEM OF A MOTOR VEHICLE

BACKGROUND AND SUMMARY OF THE INVENTION

The invention relates to a filter device for a filter system of a motor vehicle. The invention further relates to a filter element for the filter device and a filter module for the filter device.

Such filter devices are known particularly as air dryers for compressed air systems for braking systems of trucks, Such filter devices usually comprise a filter element which is attached to a filter module and can be removed from time to time for replacing corresponding components. For that purpose, the filter element has been secured to the filter module thus far by rotating about a central axis in a rotational direction and released from the filter module by rotating in an opposite rotational direction. So far, a pipe nozzle with external thread arranged coaxially to the filter element has been provided on the side of the filter module, wherein the filter element with a central internal thread arranged in its base is screwed on to or off from the pipe nozzle. This screw connection is relatively time-consuming during assembly and in addition, a precise torque must be generated with it between the filter element and the filter module in order to achieve sufficient sealing between the components. This requires a specific tool in order to generate the required torque.

In addition, an air dryer for air brake systems of vehicles is known from DE 8228745 U1. This air dryer comprises an air dryer cartridge which can be attached to an air dryer module by means of a bayonet closure fastened to the outer circumference of the connecting surface.

Therefore, the present invention addresses the problem of creating a filter device, a filter element, and a filter module of the initially described type, with which an improved assembly and sealing within the filter device can be achieved.

In order to create a filter device that is particularly easy to install and has a high tightness, it is provided that the securing means of the filter element are designed as arc-shaped guide grooves in the base of the filter element, the grooves having an insertion opening at one end and a latching contour at the other end for a corresponding head pin as securing means of the filter module, and an edge region of each arc-shaped guide groove slopes from the insertion opening to the latching contour. The filter element is particularly an air dryer cartridge of an air dryer of a compressed air system of a truck which is connected to an air dryer module of the air dryer by means of the bayonet closure. The bayonet closure allows for both a much faster installation or removal of the filter element and the filter module and a higher tightness of the filter device because each of the securing means arranged on the filter module and on the filter element can be adjusted to one another such that there is always a continuous or reproducible sealing force which acts on the seal between the filter element and the filter module. Such a sealing force is obviously much easier to adjust than the screw connection of filter element and filter module known from the prior art because the screw connection requires the use of a separate tool or a separate adjustment of the torque. This is not the case in the present case with the use of securing means on both the filter element and the filter module which form the bayonet closure; in fact, these elements can be adjusted reproducibly to one another by selecting a suitable geometry such that it always results in the same sealing forces.

It has proven advantageous for the securing means of the air dryer cartridge to be designed as arc-shaped guide grooves which have the insertion opening at one end and the latching contour at the other end for the corresponding head pin as securing means of the air dryer module. As a result, a bayonet closure is ensured which allows for both an easy insertion of the corresponding head pins at the guide grooves and ensures a secure immobilization of the head pins in the appropriate end positions on the guide grooves.

In addition, the edge region of each arc-shaped guide groove slopes upwardly from the insertion opening to the latching contour. As a result, during securing of or the rotation of the air dryer cartridge, a sealing force for its fastening can be increased continuously until the appropriate end position of the air dryer cartridge is reached.

In a further embodiment of the invention, it has proven advantageous if latching means, which interact with one another, are provided on the filter element and the filter module, by means of which the filter element is secured in an fastened end position on the filter module. As a result, an unintentional release of the bayonet closure between the filter element and the filter module can be reliably prevented.

The advantages described above in connection with the filter device according to the invention follow in a similar manner for the filter element and for the filter module.

A further advantageous embodiment of the invention provides that on the underside of a base having the arc-shaped guide grooves, a support element with a seal is provided. With this support element, a particularly even sealing force is generated.

In a further embodiment of the invention, the securing means of the filter module are designed as head pins which interact with the corresponding guide grooves. Such head pins ensure a particularly quickly releasable or quickly producible bayonet closure.

A further advantageous embodiment of the invention provides that the filter module has a central center bearing, around which the filter element is rotatable. Thus, a particularly easily reproducible rotary movement about the central axis of the filter element is ensured which guarantees a particularly reliable and secure installation of the filter element on the filter module.

It is further provided that the filter module has a continuous annular sealing surface, on which a seal of the filter element can be supported. Such a sealing surface allows for particularly even sealing forces in a continuous manner and thus for a particularly favorable sealing of the filter device.

Further advantages, features, and details of the invention follow from the following description of a preferred embodiment and the drawings. The features and combinations of features mentioned above in the description and the features and combinations of features mentioned below in the description of the drawings and/or shown individually in the drawings are not only usable in each of the indicated combinations but also in different combinations or in isolation without exceeding the scope of the invention.

Other objects, advantages and novel features of the present invention will become apparent from the following detailed description of one or more preferred embodiments when considered in conjunction with the accompanying drawings.

BRIEF DESCRIPTION OF THE DRAWINGS

FIGS. 1a, 1b, 1c each show sectional perspective views onto an air dryer cartridge and an air dryer module of an air dryer, wherein a sequence of the installation of the air dryer cartridge on the air dryer module is shown, and wherein in FIGS. 1b and 1c, a respective connection of a corresponding head pin of the air dryer module with an arc-shaped guide groove in the base of the air dryer cartridge in an unlocked and locked state is shown in detail;

FIG. 2 shows in sections a perspective cutaway view of the base of the air dryer cartridge in the area of one of the guide grooves, wherein a slope from an insertion opening to a latching contour can be seen;

FIG. 3 shows a sectional perspective view and a perspectively cut detailed view of one of the arc-shaped guide grooves in the base of the air dryer cartridge, wherein the interaction of a latching contour of the guide groove with the associated head pin of the air dryer module is shown in detail;

FIG. 4 shows a sectional and perspective cutaway view of the base of the air dryer cartridge which is attached to the air dryer module, wherein particularly the sealing of the air dryer cartridge against the air dryer module can be seen.

DETAILED DESCRIPTION OF THE DRAWINGS

In the following, an exemplary embodiment of the filter element, which is replaceable and can be used for filtering fluidic or gaseous media, of the filter device is described as an air dryer cartridge 10 of an air dryer. However, the description of the air dryer as an exemplary filter device is not supposed to be understood as limiting. The filter device can be used in all kinds of applications. For example, the filter element of the filter device can alternatively be a filter element of an air conditioning system of a vehicle, or also a filter element for oil or fuel which is to be connected with a connector in the through-flow cross-section and is supposed to be sealed against the connector.

Figure 5A:
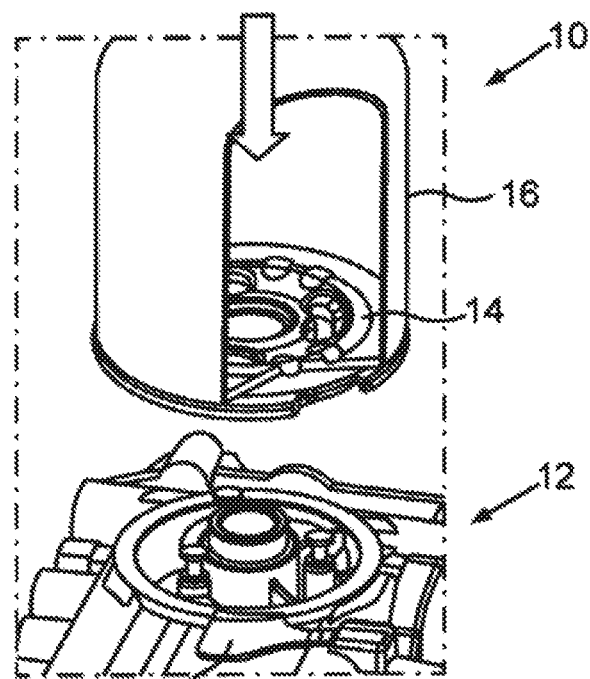
FIGS. 5a, 5b each show perspective views of the air dryer prior to and after installation, wherein particularly respective interacting latching means can be seen, by means of which the air dryer cartridge is secured in the fastened end positions on the air dryer module.

FIGS. 1a to 1c each show the air dryer cartridge 10 and an air dryer module 12 in a perspective view of the air dryer for a compressed air system of a braking system of a truck. The air dryer cartridge in its entirety can be seen in a respective perspective view in FIGS. 5a and 5b which will be explained in detail below. They also show the air dryer module 12

First, FIG. 1a shows a starting position for the installation of the air dryer cartridge 10, in which it is not yet fastened to the air dryer module 12. It particularly shows a base 14 of the air dryer cartridge 10 in the shape of a disc with a pot-shaped or cylindrical cartridge body 16 attached to it. In the base 14, a central opening 18 is provided, which is arranged coaxially to a center longitudinal axis of the air dryer cartridge 10, the opening 18 being surrounded by three arc-shaped guide grooves 20 which are designed as securing means and arranged at an angle of 120 degrees to one another.

As can be seen in FIG. 1a, the air dryer module 12 comprises a central center bearing 22 in the form of a pipe nozzle which, with its internal outer diameter, is adjusted to the inner diameter of the opening 18 of the base 14 of the air dryer cartridge 10. It can further be seen that the center bearing 22 is surrounded by three head pins 24 designed as securing means and arranged on the side of the air dryer module 12, the head pins 24—analogously to the guide grooves 20 on the side of the cartridge—are also arranged at an angle of 120 degrees to one another. In turn, the head pins 24 are surrounded by an continuous annular sealing surface 26 which nins coaxially to the center bearing 22 and the effect of which shall be explained in detail below.

For installing the air dryer cartridge 10 on the air dryer module 12, it is first—as the first movement of a bayonet closure—placed onto the air dryer module 12 according to the arrow 28 in FIG. 1a. For that purpose, the three guide grooves 20 in the base 14 of the air dryer cartridge 10 each have insertion openings 30 at one end, and so corresponding heads 32 of the head pins 24, which are enlarged in a mushroom-like manner, can penetrate the insertion openings 30, when the air dryer cartridge 10 is placed onto the air dryer module 12. This can be seen particularly in FIG. 1b which in the upper overall view shows, how the head pins 24 of the air dryer cartridge 10 penetrate the associated insertion openings 30 in the base 14 of the air dryer cartridge 10. The lower depiction shows a detailed view of one of the head pins 24 that penetrates the associated insertion opening 30 of the associated arc-shaped guide groove 20.

Proceeding from the attached position shown in FIG. 1b, it is now possible according to the arrow 34 shown in FIG. 1—as the second movement of a bayonet closure—to rotationally move the air dryer cartridge 10 in a clockwise direction in order to thus form the bayonet closure between the corresponding head pin 24 and the associated arc-shaped guide grooves 20. The center bearing 22 of the air dryer module 12, which interacts with the opening 18, is used as a pivot bearing, around which the air dryer cartridge 10 is rotated. By rotating the air dryer cartridge 10 in the clockwise rotational direction, the corresponding head pins 24 are moved from the position according to FIG. 1b, in which they penetrate the insertion openings 30, to the other end position shown in FIG. 1c, in which they are received by a latching contour 36 of the associated guide groove 20, the latching contour 36 being shown in sections and enlarged in a respective perspective view in FIG. 3. This latching contour 36 is essentially formed by a corresponding latching cam 38, and so—as can be seen in the cutaway view shown diagonally left at the bottom of FIG. 3—the head 32 of the associated head pin 24 is held ensnared within the latching contour 36 or the latching cam 38. Overall, it can be seen in FIG. 3 that each respective guide groove 20 is essentially designed as an arc-shaped keyhole contour.

Furthermore, it can be seen in FIG. 2, which shows a sectional cutaway view of a ring sector of the base 14 of the air dryer cartridge 10, an edge region 40 of each arc-shaped guide groove 20 slopes from the associated insertion opening 30 to the latching contour 36, and so with the progression of the rotational movement from the unlatched position according to FIG. 1b to the latched position according to FIG. 1c, a contact pressure is increased, by means of which the air dryer cartridge 10 is pressed against the air dryer module 12. As a result—as can be seen in FIG. 4 in a sectional and slightly perspective cutaway view—a force according to arrow 42 is generated which acts against corresponding forces according to the arrows 44 in the area of the latching contour 36. As a result, a contact force according to arrow 46 is generated, by means of which a continuous or annular seal 48 with an approximately rectangular cross-section is pressed against the corresponding sealing surface 26 on the side of the air dryer module 12.

The seal 48 is attached on the underside of a continuous and annular support element 50 in the form of a support plate, wherein the support plate is securely fastened to the underside of the base 14 of the air dryer cartridge 10. In the present case, this is accomplished by a multiplicity of tabs 52 which engage the base 14 in the area of corresponding openings 54 from behind. As a result, the slope in the area of the respective edge areas 40 of the guide grooves 20 generates a sealing force according to arrow 46 which presses the seal 48 against the corresponding sealing surface 26 of the air dryer module 12. The pressure is evenly distributed by the support element 50.

Figure 5B:
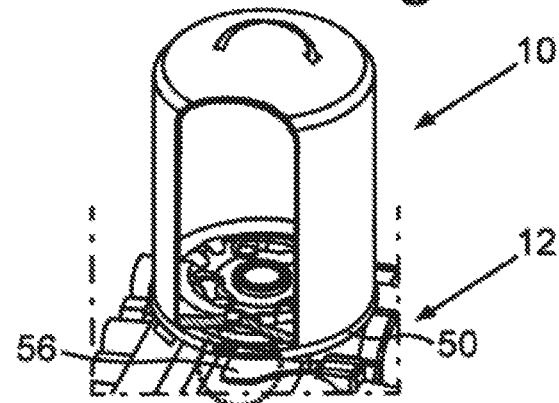

FIGS. 5a and 5b once again show the installation of the air dryer cartridge 10 on the air dryer module 12, wherein FIG. 5a shows these two components in an unassembled state and FIG. 5b shows them in an assembled state. In addition, FIGS. 5a and 5b essentially show that on the outer side of the sealing surface 26, a latching means 56 in the form of a snap-in tongue is presently provided which—as can be seen in FIG. 5b—audibly engages as a snap lock with a latching cam 58 of the support element 50 on the underside of the base 14 of the air dryer cartridge 14, when the fastened end position of the air dryer cartridge 10 according to FIG. 1c is reached. More precisely, the latching means 56 has for that purpose a corresponding latching shoulder 60 which interacts with a corresponding latching shoulder 62 of the latching cam 58. With an audible click or similar sounds, the secure and fastened end position of the air dryer cartridge 10 is reached and audibly conveyed to the installer. For the disassembly, the latching means 56 can be pushed accordingly against the air dryer module 12 or the latching mechanism can be released in order to return the air dryer cartridge 10 in a counterclockwise manner to the position shown in FIG. 1b, from which the air dryer cartridge 10 can be removed from the air dryer module 12 and, for example, entirely, or components thereof, replaced.

Overall, it can thus be seen from the drawings that presently, a simple option is created by means of appropriate securing means—both the head pins 24 and the guide grooves 20—to produce a bayonet closure between the air dryer cartridge 10 and the air dryer module 12 by rotating in one rotational direction, and to release the bayonet closure by rotating in the other direction, wherein the attaching, i.e. the movement of the air dryer cartridge 10 in axial direction, is achieved by providing a correspondingly enlarged insertion opening 30 with the corresponding guide groove 20. The bayonet closure not only allows for a very quick installation, but due to the design of the guide grooves 20 and the head pins 24, a defined force (arrows 46) can be generated which is applied to the seal 48, thus holding the air dryer cartridge 10 on the air dryer module 12.

The invention claimed is:

1. An apparatus for a filter system of a motor vehicle, comprising:
   a filter element which is securable to a filter module by rotating about a central axis in a rotational direction and is releasable from the filter module by rotating about the central axis in an opposite direction to the rotational direction; and
   a filter element securing structure disposed on the filter element, wherein the filter element securing structure interacts with a respective securing structure disposed on the filter module to form a bayonet closure;
   wherein the filter element securing structure is an arc-shaped guide groove in a base of the filter element, wherein the arc-shaped guide groove has an insertion opening at a first end and a latching contour at a second end, wherein the respective securing structure disposed on the filter module is a head pin that is receivable in the arc-shaped groove, and wherein an edge region of the arc-shaped guide groove slopes upwardly from the insertion opening to the latching contour such that when the filter element is rotated in the rotational direction to secure the filter element to the filter module a contact force is generated in an axial direction by the edge region that slopes upwardly from the filter element securing structure disposed on the filter element to the respective securing structure disposed on the filter module and such that the contact force generated by the edge region that slopes upwardly is increased with a progression of the rotation of the filter element.

2. An apparatus for a filter system of a motor vehicle, comprising:
   a filter element which is securable to a filter module by rotating about a central axis in a rotational direction and is releasable from the filter module by rotating about the central axis in an opposite direction to the rotational direction;
   a filter element securing structure disposed on the filter element, wherein the filter element securing structure interacts with a respective securing structure disposed on the filter module to form a bayonet closure;
   wherein the filter element securing structure is an arc-shaped guide groove in a base of the filter element, wherein the arc-shaped guide groove has an insertion opening at a first end and a latching contour at a second end, wherein the respective securing structure disposed on the filter module is a head pin that is receivable in the arc-shaped groove, and wherein an edge region of the arc-shaped guide groove slopes from the insertion opening to the latching contour such that when the filter element is rotated in the rotational direction to secure the filter element to the filter module a contact force is generated in an axial direction from the filter element securing structure disposed on the filter element to the respective securing structure disposed on the filter module and such that the contact force is increased with a progression of the rotation of the filter element; and
   a latching cam disposed on the filter element, wherein the latching cam interacts with a respective snap-in tongue disposed on the filter module to secure the filter element on the filter module.

3. The apparatus according to claim 1 further comprising a plurality of the filter element securing structure that is disposed on the filter element, wherein the plurality of the filter element securing structures interact with a plurality of the respective securing structure that is disposed on the filter module.

4. The apparatus according to claim 1 further comprising a support element with a seal that is disposed on an underside of the base which has the arc-shaped guide groove.

5. A filter system of a motor vehicle, comprising:
   a filter module; and
   a filter element which is securable to the filter module by rotating about a central axis in a rotational direction and is releasable from the filter module by rotating about the central axis in an opposite direction to the rotational direction;
   wherein a filter element securing structure is disposed on the filter element and wherein the filter element securing structure interacts with a respective securing structure disposed on the filter module to form a bayonet closure;
   wherein the filter element securing structure is an arc-shaped guide groove in a base of the filter element, wherein the arc-shaped guide groove has an insertion opening at a first end and a latching contour at a second end, wherein the respective securing structure disposed on the filter module is a head pin that is receivable in the arc-shaped groove, and wherein an edge region of the arc-shaped guide groove slopes upwardly from the insertion opening to the latching contour such that when the filter element is rotated in the rotational direction to secure the filter element to the filter module a contact force is generated in an axial direction by the edge region that slopes upwardly from the filter element securing structure disposed on the filter element to the respective securing structure disposed on the filter module and such that the contact force generated by the edge region that slopes upwardly is increased with a progression of the rotation of the filter element.

* * * * *